May 12, 1959   M. E. DUMESNIL ET AL   2,886,476
RESISTORS
Filed Oct. 19, 1956

Fig. 1

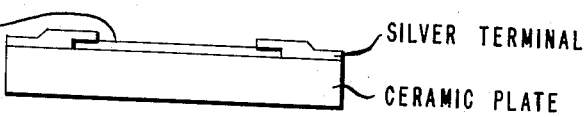

FIRED-ON CONDUCTIVE LAYER COMPRISING VITREOUS FLUX, FINELY DIVIDED CARBON AND ELEMENTAL BORON.

SILVER TERMINAL

CERAMIC PLATE

Fig. 2

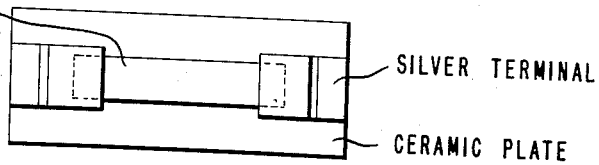

FIRED-ON CONDUCTIVE LAYER COMPRISING VITREOUS FLUX, FINELY DIVIDED CARBON AND ELEMENTAL BORON.

SILVER TERMINAL

CERAMIC PLATE

INVENTORS,
MAURICE EDWARD DUMESNIL,
OLIVER ALTON SHORT

BY *Norris E. Ruckman*

ATTORNEY

United States Patent Office 2,886,476
Patented May 12, 1959

2,886,476

RESISTORS

Maurice Edward Dumesnil and Oliver Alton Short, Metuchen, N.J., assignors to E. I. du Pont de Nemours and Company, Wilmington, Del., a corporation of Delaware Application October 19, 1956, Serial No. 616,937

9 Claims. (Cl. 117—212)

This invention relates to electric resistors of carbon in a vitreous flux, and is more particularly concerned with vitreous compositions and enamels containing carbon stabilized with boron which are suitable for firing on ceramic dielectric material to produce electric resistors, and with the resulting resistors.

The printing of electric circuits offers many advantages over the use of wiring and is expanding rapidly. A suitable method is to apply an enamel containing a finely divided metal, such as silver, and a binder to a dielectric material by the stencil-screen process. The enamel can also be applied in the desired pattern by processes in which a brush or spray is employed instead of the squeegee used in screen printing. A variety of enamel compositions and dielectric materials have been used, but the best conductor circuits are obtained when a vitreous enamel is fired on a ceramic or glass base.

Printed resistors may be prepared by substituting carbon for the metal powder used when preparing conductors. However, it has not been possible previously to fire enamels containing carbon, because the carbon is oxidized in the process. Hence carbon resistors have required the use of organic binders which could be cured at a relatively low temperature. Such resistor films have been characterized by lack of stability and low temperature breakdown. A further defect of such resistors, when fired-on conductor circuits are employed, is that the resistors have had to be prepared and cured in a separate operation from the conductors.

It is an object of this invention to provide a vitreous composition containing carbon which can be applied to and fired on a ceramic base without oxidizing the carbon to produce a carbon resistor. Another object is to provide such a composition in the form of a vitreous enamel suitable for printing and firing on a ceramic insulator to produce a carbon resistor. A further object is to provide fired on vitreous enamel carbon resistors.

In the drawing, which illustrates a carbon resistor prepared as described in Example 1, Figure 1 is a side view of the resistor, and
Figure 2 is a top view of the same resistor.

In accordance with this invention a finely divided mixture of carbon, a vitreous flux in suitable amount to serve as a stabilizing binder for the carbon after firing, and elemental boron in sufficient amount to stabilize the carbon during firing is prepared. This vitreous composition has been found to yield highly desirable resistors by simple firing in air on ceramic, including glass, insulating materials. The resistors are characterized by good reproducibility, low temperature coefficient of resistance, and high stability to aging and to temperature breakdown.

The vitreous composition may be dispersed in any conventional organic liquid vehicle to form an enamel for application by any of the usual methods, as by brush, spray or squeegee. For printing by the stencil-screen process the enamel should have the consistency of a paste. Since the elemental boron is sensitive to water, the composition should be kept dry, and the organic liquid vehicle should be anhydrous. The composition has been found suitable for firing by methods conventionally used with such fluxes. This is an outstanding advantage because the resistors can be fired in a single operation with metallic conductor portions of a printed circuit, and by controlling the firing in the same manner as used for the latter previously.

The carbon may be in the form of graphite or carbon black. By varying the content and type of graphite or carbon black, a series of compositions can be formulated to provide resistors having resistances between 500 ohms and 2 megohms per square print 20 to 30 microns in thickness. Graphite is suitable for the lower range of about 500 ohms to 0.1 megohm, and carbon black is suitable for the range from about 50,000 ohms to 2 megohms. The resistance of a print will vary inversely with the percentage of carbon present. The amount of carbon in the vitreous composition should preferably be from 5% to 50% of the dry mixture. Variation in the thickness of the print will also vary the resistance, and higher resistance values can be obtained by increasing the proportion of vehicle in the enamel used for printing. The type and grade of graphite or carbon black used will, of course, affect the current-voltage behavior and the temperature-resistance variation of the printed resistor in the manner known for carbon resistors previously available.

The vitreous flux can be of any conventional composition but preferably one that is not easily reduced during the firing of the composition of this invention. Fluxes containing lead oxide and cadmium oxide can be used but the most suitable flux is an alkaline earth metal silicate or borosilicate flux containing (by weight):

40–75% BaO, CaO or SrO
0–30% $B_2O_3$
10–30% $SiO_2$ and

0–25% $Na_2O$
or up to 13% of $Na_2O$ replaced by $K_2O$, or $Li_2O$.

The preferred composition is a low maturing borosilicate flux lying in the following range:

50–70% BaO, CaO or SrO
10–30% $B_2O_3$
10–30% $SiO_2$ and

10–25% $Na_2O$
or up to 14% of $Na_2O$ replaced by $K_2O$, or $Li_2O$.

The carbon and milled flux may be mixed in the ball mill with water as described for preparation of the flux. Thorough milling is necessary for good reproducibility in resistance value of fired films. Filler materials may be added to increase the resistance of the fired film, e.g., silica, alumina, titania, barium titanate or other materials having a relatively high dielectric constant.

The boron powder is sensitive to water and is added as a separate step. The carbon-flux mixture is thoroughly dried after the ball-milling step and then milled with the boron in an inert organic liquid such as benzene or one of the liquids mentioned below. The boron is preferably in the form of a very fine amorphous powder. The amount used should not exceed 40% of the weight of the dry mixture, as greater amounts cause a high resistance value accompanied with poor reproducibility of the final resistance value. As little as 0.5% will stabilize the carbon during firing.

The vitreous composition prepared as described above may be packaged as a dry powder and sold for subsequent use with a liquid vehicle. An enamel is prepared by mixing with any conventional vehicle. A variety of organic liquids with or without thickening agents, stabilizing agents, or the like, may be used in applying the vitreous composition to the ceramic insulating material for firing, for example, methyl, ethyl, butyl, propyl or higher alcohols, the corresponding esters such as the acetates, propionates, etc., the terpenes and liquid resins, for example, pine oil, alpha-terpineol, and the like, and other liquids without limitation, the function of the liquid vehicle being mainly to form a liquid or paste of the desired consistency for application purposes. The vehicles may contain or be composed of volatile liquids to promote fast setting after application, or they may contain waxes, thermoplastic resins, or wax-like materials which are thermofluid by nature whereby the composition may be applied to a ceramic insulator while at an elevated temperature to set immediately upon contact with the ceramic base.

The ceramic insulating material may be comprised of any ceramic material that can withstand the firing temperature of the vitreous enamel-conductive material composition. For example, glass, porcelain, refractory, barium titanate, metal carbides, or the like, may be used. Preferably, the ceramic insulating materials should have a smooth, substantially uniform surface structure but this is not absolutely necessary.

As above stated, the vitreous enamel-conductive material composition may be applied to the ceramic insulator in any desired manner such as by painting, printing, squeegeeing, spraying, or the like.

The ceramic insulator to which the vitreous conductive material is applied is then subjected to drying, if necessary, and firing whereby to solidly bind the conductive material to the ceramic base. This may be done in the conventional manner of firing enamels or glazes in a lehr or furnace. In the event that the vehicle employed contains a volatile solvent, it is desired to dry the applied vitreous enamel-conductive material paste for a period of five to twenty minutes at a temperature of 200° to 400° F. to remove the solvent. If the vehicle is a thermofluid substance, no drying is generally necessary. The temperature of the firing operation will depend mainly upon the composition of the vitreous flux employed.

The following examples are given to illustrate certain details of the invention, it being understood that the details of the examples are not to be taken as in any way limiting the invention thereto. In the examples, percentages are by weight.

*Example 1*

A mix containing 16.6% of crystalline graphite and 83.4% of barium borosilicate frit previously ball milled 16 hours (prepared from 55% $BaCO_3$, 30% boric acid and 15% $SiO_2$) is ball milled 64 hours. The slurry is filtered and dried. Sixty grams of this dry mix is mulled with forty grams of amorphous boron (90–92% pure) and 100 grams of an oil composed of 92% alpha terpineol and 8% ethyl cellulose. This paste is printed on ceramic dielectric chips, such as barium titanate, through a 200-mesh screen to yield a ⅛ by ⁷⁄₁₆ inch print. Conductive silver terminals are then printed with a silver paste, so that the net area of the resistor print is ⅛ by ⅜ inch. The prints are dried by placing the chips over a hot plate at a temperature of about 120° C. The ceramic dielectric chips are fired in a continuous belt furnace over a 20-minute cycle with a maximum temperature of 1400° F.±10° F.

The resulting resistor film has a resistance of 8000 ohms with a variation of ±15% on 25 chips. It has a linear voltage current characteristic up to a load of ½ watt. The coefficient of resistance with temperature is +4% of the value at 25° C. from 25° C. to −55° C. and −7.5% from 25° C. to 150° C.

*Example 2*

Example 1 is repeated using a calcium borosilicate flux in place of the barium borosilicate flux, with other details being the same. This flux is prepared from a melt of 50% calcium carbonate, 35% boric acid and 15% $SiO_2$. Substitution of a strontium borosilicate flux prepared from a melt of 55% strontium carbonate, 35% boric acid and 10% $SiO_2$ yields like results, as does a flux prepared from 45% barium carbonate, 10% calcium carbonate, 30% boric acid and 15% $SiO_2$.

*Example 3*

A mix containing 8% crystalline graphite and 92% barium borosilicate frit similar to Example 1 is ball milled 80 hours. The slurry is filtered and dried. Seventy-five grams of this dried mix is combined with 25 grams of amorphous boron and 150 ml. or chloroform and ball milled for two hours. The slurry is dried by evaporation of the chloroform. The resulting powder is dispersed in the same medium as in Example 1 in a ratio of 1 to 1. Squeegee prints ⅛ inch square are prepared on barium titanate chips and fired as in Example 1.

The resulting resistance value is 65,000 ohms with a variation of ±8% on 50 prints, and a linear voltage current behavior up to ½ watt. The variation of the resistance value is +8% from 25° C. to −55° C. and −6% from 25° C. to 150° C.

*Example 4*

A paste is prepared, as in Example 1, containing 20% degassed carbon black, 60% barium borosilicate flux and 20% boron, on an oil-free basis. Prints ⅛ inch square are prepared and fired on ceramic chips as in Example 1. The resistance of the fired prints is 2 megohms ±15%.

*Example 5*

A paste is prepared, as in Example 1, containing 3.3% graphite, 40% lampblack, 16.7% barium borosilicate flux and 40% boron, on an oil-free basis. Prints ⅛ inch square are prepared and fired on ceramic chips as in Example 1. The resistance of the fired prints is 48,000 ohms ±8%.

*Example 6*

A paste is prepared, as in Example 1, containing 9.5% graphite, 25% fine alumina, 50.5% barium borosilicate flux and 15% boron, on an oil-free basis. Prints ⅛ inch square are prepared and fired on ceramic chips as in Example 1. The resistance of the fired prints is 65,000 ohms ±8%.

Since many different embodiments of the invention may be made without departing from the spirit and scope thereof, it is to be understood that the invention is not limited by the specific illustrations except to the extent defined in the following claims.

What is claimed is:

1. A vitreous composition, adapted to be applied to and fired on a ceramic insulating material to produce an electric resistor, comprising a finely divided mixture of carbon, a vitreoux flux as a stabilizing binder for the carbon after firing, and 0.5% to 40% of elemental boron to stabilize the carbon during firing.

2. A composition as defined in claim 1 in which the carbon is graphite.

3. A composition as defined in claim 1 in which the carbon is carbon black.

4. A composition as defined in claim 1 in which the vitreous flux is an alkaline earth metal silicate.

5. A composition as defined in claim 1 in which the vitreous flux is an alkaline earth metal borosilicate.

6. A composition as defined in claim 1 in which the carbon content is 5% to 50% of the mixture.

7. A vitreous enamel adapted to be printed and fired on a ceramic insulating material to produce an electric resistor comprising a finely divided mixture of 5% to 50% of carbon, a vitreoux flux as a stabilizing binder for the carbon after firing, and 0.5% to 40% of elemental boron to stabilize the carbon during firing, the mixture being dispersed in an anhydrous organic liquid vehicle.

8. An electric resistor comprising a ceramic insulator and a fired-on conductive layer comprising a vitreous flux containing 5 to 50% of finely divided carbon and 0.5% to 40% of elemental boron, based on the weight of the conductive layer.

9. In combination with a printed electric circuit of vitreous flux containing finely divided metal fired on a ceramic insulator, a fired-on printed resistor comprising a vitreous flux containing 5% to 50% of finely divided carbon and 0.5% to 40% of elemental boron, the amounts being based on the weight of flux plus carbon plus boron.

References Cited in the file of this patent
UNITED STATES PATENTS

| | | |
|---|---|---|
| 1,978,323 | Power | Oct. 23, 1934 |
| 2,371,211 | Barrington | Mar. 13, 1945 |
| 2,671,735 | Grisdale et al. | Mar. 9, 1954 |
| 2,679,568 | Smith et al. | May 25, 1954 |
| 2,699,510 | Smelt | Jan. 11, 1955 |
| 2,721,153 | Hopf et al. | Oct. 18, 1955 |

UNITED STATES PATENT OFFICE
CERTIFICATE OF CORRECTION

Patent No. 2,886,476

May 12, 1959

Maurice Edward Dumesnil et al.

It is hereby certified that error appears in the printed specification of the above numbered patent requiring correction and that the said Letters Patent should read as corrected below.

Column 2, line 51, for "10-25% $Na_2O$" read -- 0-25% $Na_2O$ --; line 52, for "or up to 14%" read -- or up to 13% --; column 4, lines 59 and 75, for "vitreoux", each occurrence, read -- vitreous --.

Signed and sealed this 22nd day of September 1959.

(SEAL)
Attest:

KARL H. AXLINE
Attesting Officer

ROBERT C. WATSON
Commissioner of Patents